(12) United States Patent
Lipstein et al.

(10) Patent No.: US 10,140,665 B1
(45) Date of Patent: Nov. 27, 2018

(54) GRAPHICAL USER INTERFACE FOR MANIPULATING RELATIONSHIPS BETWEEN ELEMENTS

(71) Applicant: Amazon Technologies, Inc., Seattle, WA (US)

(72) Inventors: Shawn Allan Michael Lipstein, Issaquah, WA (US); Raymond Paul Weikel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 485 days.

(21) Appl. No.: 14/862,056

(22) Filed: Sep. 22, 2015

(51) Int. Cl.
  *G06Q 40/00*  (2012.01)
  *G06F 3/0484*  (2013.01)

(52) U.S. Cl.
  CPC ......... *G06Q 40/12* (2013.12); *G06F 3/04847* (2013.01)

(58) Field of Classification Search
  CPC ............................ G06Q 30/0201; G06Q 40/12
  See application file for complete search history.

(56) References Cited

U.S. PATENT DOCUMENTS

| | | | |
|---|---|---|---|
| 2014/0278737 A1* | 9/2014 | Manthey | G06Q 30/0201 705/7.29 |
| 2017/0236212 A1* | 8/2017 | Purville | G06Q 40/12 705/30 |
| 2017/0236217 A1* | 8/2017 | Suggula | G06Q 40/12 705/30 |

* cited by examiner

*Primary Examiner* — Talia F Crawley
(74) *Attorney, Agent, or Firm* — Kilpatrick Townsend & Stockton LLP

(57) ABSTRACT

Techniques described herein include a platform configured to provide for association of an accounting element with one or more mapping policies. The accounting element may be associated with a plurality of line items, some of which may be associated with a mapping policy. Once associations between accounting elements and mapping policies have been created, transaction events related to the accounting element may be processed in accordance with the mapping policies. In some embodiments, information from the transaction event may be used to create an accounting event which may be recorded as a journal entry in a ledger. In some embodiments, accounting events may also be validated prior to being recorded.

20 Claims, 9 Drawing Sheets

GRAPHICAL USER INTERFACE FOR MANIPULATING RELATIONSHIPS BETWEEN ELEMENTS

BACKGROUND

With an increasing level of accounting oversight being implemented year after year, accounting platforms and systems have become increasingly complex. Businesses are now required to document a number of transactions in greater detail than they were just a few years ago. With this increased complexity, it is increasingly likely for accountants to make mistakes and commit oversights.

BRIEF DESCRIPTION OF THE DRAWINGS

Various embodiments in accordance with the present disclosure will be described with reference to the drawings, in which.

DETAILED DESCRIPTION

Figure 1:
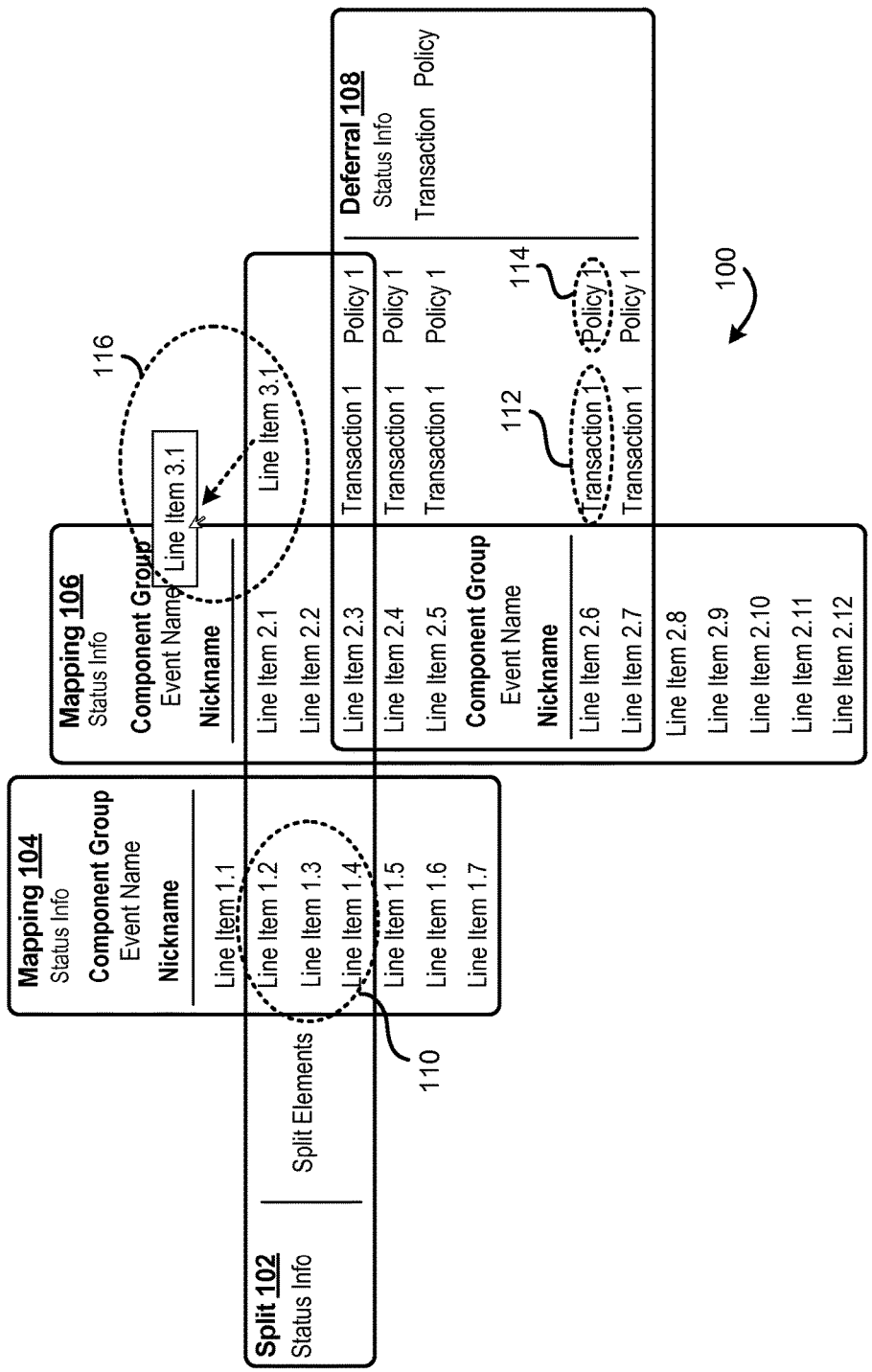
FIG. 1 depicts an illustrative example graphical user interface that may be implemented in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include a graphical user interface (GUI) and platform for establishing and maintaining relationships between transaction events, products, and deferrals. In particular, the platform is useful for displaying information related to various product offerings, such as line items and accounting policies. Additionally, a user may be presented with information related to any deferral policies affecting one or more line items. In some embodiments, the user is able to select an accounting element and is provided with various details related to the selected accounting element. An element may be any object or group of objects capable of being configured independently. Accordingly, an accounting element may be any object or group of objects used for accounting purposes that is capable of being configured independently.

Some business entities may offer for sale one or more multi-element arrangement products. A multi-element arrangement may include any combination of services, software, hardware and/or financing. For example, a multi-element arrangement may be a subscription service that includes video streaming, music streaming, and free shipping on product purchases, all for a single yearly fee. Despite being bundled into a single product offering, each element of the multi-element arrangement may be governed by separate accounting principles. For example, leased hardware is subject to Statement of Financial Accounting Standards (SFAS) No. 13, "Accounting for Leases," whereas software is subject to the American Institute of Certified Public Accountants (AICPA) Statement of Position (SOP) No. 97-2, "Software Revenue Recognition." Additionally, each element of the multi-element arrangement may have a separate value to the business offering the multi-element arrangement. The business may wish to allocate a relative fair value to each separate element of the multi-element arrangement. In some cases, the business may wish to recognize a loss for a particular element and a gain for the overall multi-element arrangement or vice versa. For this reason, a multi-element arrangement must often be split into multiple separate units for accounting purposes. For the purposes of this disclosure, a unit of accounting that has been separated from a multi-element arrangement may be referred to as a product element. The allocation of one or more values amongst various product elements may be referred to as a "split." The present disclosure provides a useful platform and system for keeping track of relationships between accounting line items and accounting elements, which can otherwise be problematic and time consuming.

By way of illustrative example, a user may be given the ability to select a single product element or split to determine what line items are associated with that product element or split. Furthermore, the platform may be configured to present each transaction event that has an impact on the split and display what that impact is. A transaction event may be any event that needs to be reported in at least one journal entry. An accounting event may be any update to a journal entry. Additionally, a user may be given the ability to quickly identify various accounting polices associated with the split, the transaction event, or any particular line item. In some embodiments, a user may select a split or mapping and may be presented with each accounting element related to the selected split or mapping.

Although this disclosure describes the system with respect to an accounting platform, it should be recognized that the disclosure may be applied to any distributed system having multiple configurations related to each other. The disclosure provides a useful means of quickly identifying, adding, or editing relationships between elements of a system. Application of the disclosure to a distributed system is likely to result in increased data consistency and accuracy.

FIG. 1 depicts an illustrative example graphical user interface (GUI) 100 that may be implemented in accordance with at least some embodiments. In GUI 100, a split view 102 is depicted along with two mapping views 104 and 106 and a deferral view 108. Data for each of these views may be pulled from one or more database tables within a database. For example, data related to a split view may be queried from a split view table within an accounting database. In another example, data for each of the above views may be queried from a single database table. A user of GUI 100 may be given the ability to identify one or more line items associated with a split view 102, mapping view 104 and 106 and/or a deferral view 108. For example, the user may be given the ability to quickly identify line items of a split that are affected by a mapping, such as those depicted at 110. A line item may be any line entry (e.g., a cost or revenue stream) that would be depicted in an accounting journal entry. Additionally, a user may be given the ability to identify the transaction value 112 that is being deferred and what type of deferral policy 114 has been implemented for a particular deferral 108. Because the user is quickly able to identify relationships and the nature of each relationship, the disclosure represents a significant improvement over prior GUI interfaces in which relationships between objects were not readily apparent, by ensuring increased speed and accuracy of the system. Additionally, a user of the current disclosure is quickly able to create relationships without submitting a work request.

A split view 102 may be any graphical representation of a split. As described herein, a split may refer to a distribution of a value associated with a transaction event amongst multiple product elements of a multi-element arrangement. A split may affect a plurality of accounting lines. Each accounting line item affected by a split may also be subject to separate accounting policies and/or deferrals. For example, each time that an accounting line is subject to a distribution, the service provider may query a policy data store to identify any policies relating to a particular split or accounting line. If the service provider identifies a policy for a particular accounting line, then the distribution is made subject to that policy. For example, a split may create a currency value that may be associated with a revenue accounting line and/or a cost accounting line. In this example, the revenue accounting line may be subject to a revenue recognition policy whereas the cost accounting line may be subject to an amortization policy. Multiple splits may be associated with a single multi-element arrangement. For example, a first split may control how revenue is attributed to separate product elements of a multi-element arrangement, whereas a second split may control how expenses are attributed to separate product elements of a multi-element arrangement.

A mapping view 104 and/or 106 may be any graphical representation of a mapping. A mapping may describe the accounting definition for an event and/or the relationship between two or more activities. For example, the mapping may identify a workflow for processing a transaction. By way of illustrative example, a mapping may state that in the event of a sale transaction event, revenue (as well as line items related to revenue) is to be incremented according to the amount of the sale, and inventory (as well as line items related to inventory) is to be decremented by an amount equal to the value of the item sold. In this example, the mapping may include the translation rules "+revenue," and "−inventory." A split that is associated with the mapping may be related to a particular line item type, and may indicate how a distribution is to be made to line items of that type. More particularly, the split may indicate that there are three line items (Line item A, Line item B, and Line item C) related to revenue and any distribution between the three is to be made as 60%, 30%, and 10% respectively. By way of illustrating the above example, the service provider may receive a "sale" transaction event that includes a sale amount of $1000 and an inventory sold of $750 (the inventory sold may not match the revenue). The service provider may query the mapping database and identify the above mapping related to sale transaction events. The mapping related to the sale transaction event, in the above example, indicates that revenue line items are to be incremented and inventory line items are to be decremented. According to this example, Line item A is incremented by $600, Line item B is incremented by $300, Line item C is incremented by $100, and the line item for inventory is decremented by $750.

In some embodiments, a mapping may act as a translator between a transaction event and an accounting event by putting information related to the transaction event into an accounting format. For example, a transaction event may be a sale or promotion. Creating a mapping allows a particular transaction event to be described in a sub ledger for accounting purposes instead of rolling the transaction event into the general ledger. In some embodiments, the mapping may include an indication of various accounting line items affected by the mapping. Each line item in a mapping may be associated with one or more splits and/or one or more policies from the policy set. For example, a particular revenue line item associated with a mapping may also be affected by a revenue recognition policy.

A deferral view 108 may be any graphical representation of a deferral. A deferral may be any accounting policy that results in spreading a value associated with an accounting line item across multiple time periods. For example, an amortization may be a type of deferral in which a revenue or expense is broken up and recognized on a periodic basis over an extended period of time. Likewise, an asset's depreciation may be spread across the life of that asset. The deferral information may be stored in a deferral table of a database. The deferral table may include a current value, a time period, and a deferral curve (a mathematical formula for calculating a deferral over the particular time period). Each indicated time period, a line item affected by the deferral may be automatically incremented or decremented according to the deferral curve and the current value stored in the deferral table may be updated. In some embodiments, the service provider may receive a "deferral" transaction event, which is used to trigger the line item updates. By way of illustrative example, if a user subscribes to a monthly service, but pays for the service on a yearly basis, then a portion of the revenue received for the service may be recognized each month of the year. A deferral view may also display information useful in evaluating the deferral. For example, the deferral view may include information related to the transaction value that is being deferred and the deferral policy to be applied to that transaction value. By way of further illustration, a deferral may relate to a liability accrued in relation to a transaction event associated with mapping 106. In particular, a deferral may be an amortization of the accrued liability according to an exponential amortization policy. In this example, the transaction value is the accrued liability and the policy is the exponential amortization. In addition, a deferral view 108 may also display other useful information such as the life of the liability.

Accounting elements may be added, removed, or altered using the GUI 100. The GUI 100 may be configured to respond to user interaction with one or more hardware devices. For example, a user may add a line item to a split and/or a mapping by interacting with the GUI 100. By way of illustration, a user may manipulate a mouse or other input device to "right click" or otherwise provide outputs to the graphical user interface. select the accounting element and provide an indication that a line item should be added. In some embodiments, upon adding a line item, a user may be prompted to provide information about the line item (e.g., whether the line item represents a cost or a revenue). In some embodiments, a line item that is already associated with one accounting element may be added to a second accounting element by "drag and drop." In this example, a user is able to select an object with a cursor by manipulating a mouse or other input device and holding down a button on the input device. Once the object has been selected by the user, it may be moved to a second location in response to receiving input provided by the input device. Once in the second location, the user may let go of the button on the input device, resulting in the selected object appearing to have been moved in the GUI 100. In FIG. 1, line item 3.1 is depicted as being added to mapping 106 in this fashion at 116. In some embodiments, line items and/or other elements are rearranged and/or resized in real-time to accommodate the alteration. The term "real-time" may mean that updates to data are depicted without intentional delay, given the processing limitations of the system and the time required to accurately receive and illustrate the data. In this disclosure, one or more views may be altered in accordance with any changes or updates as the changes or updates are made.

Some embodiments of the disclosure may include one or more policy sets. A policy set may include any rules or concepts that are used to govern relationships between transactions. In some embodiments, policy sets may be stored in a database table as one or more database entries. Each policy included in a policy set may include an indication that it is related to the policy set. In some embodiments, the policy set may be stored in a document, such as a text document or an xml document. The policy set may utilize conditional statements (e.g., "if then" statements), blacklists, whitelists, mathematical formulas, or any other suitable definitions to define how an object affected by the policy should be treated. For example, a mapping may be associated with a policy set used to translate a transaction event into an accounting event. The mapping, in this example, may define what types of line items are affected by a transaction event and how it is affected (increment or decrement). In some embodiments, a policy set may include generally accepted accounting principles (GAAP) consisting of basic accounting principles and guidelines, rules and standards issued by the Financial Accounting Standards Board (FASB), and/or generally accepted industry practices. Additionally, a policy set may include mathematical algorithms for implementing a particular deferral or other accounting policy. For example, a user may indicate that a particular asset should be depreciated using a straight-line method. Given the initial value of the asset x and the useful life of the asset y, the policy set may indicate that the asset should be depreciated at a rate of x/y per time period using a straight-line method. The policy set may include algorithms for amortizing liabilities, depreciating assets, recognizing income, or for performing any other suitable accounting transaction.

Figure 2:
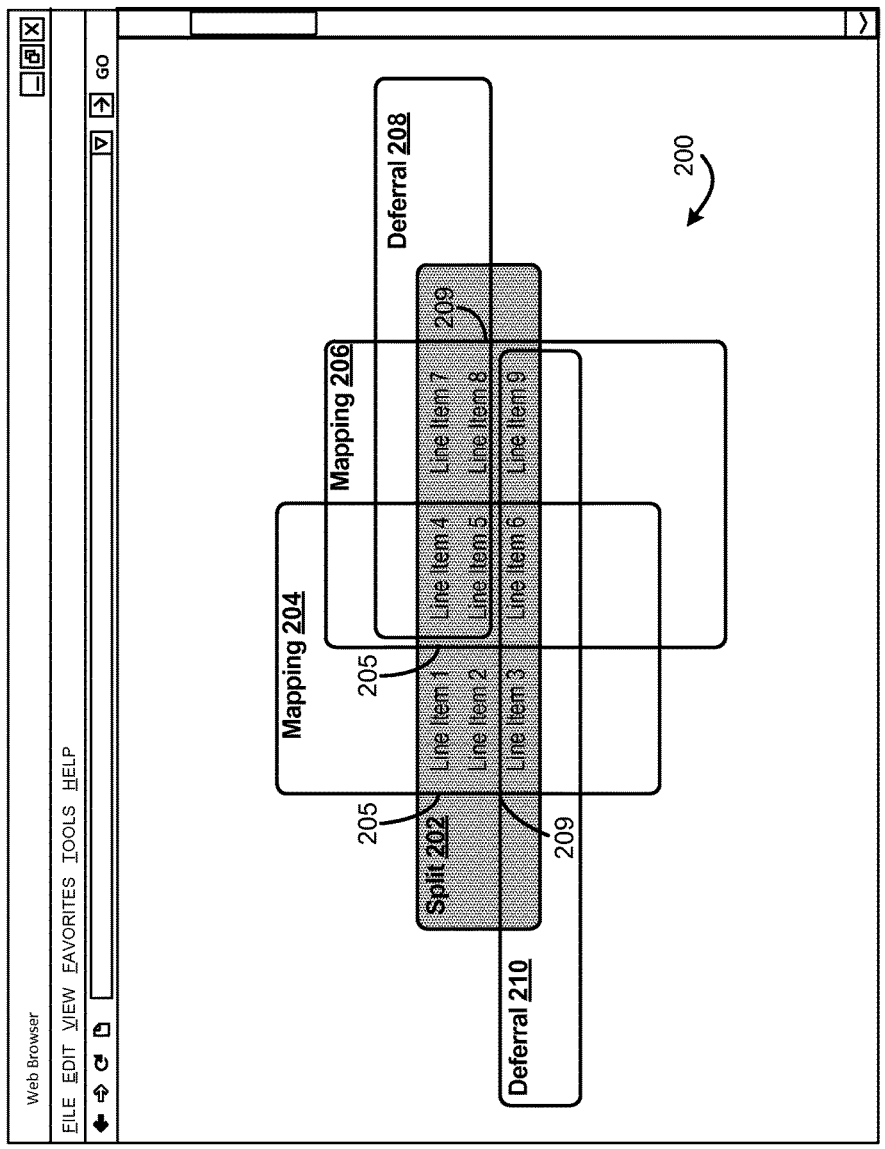
FIG. 2 depicts an illustrative example of a display that may be presented as a result of selecting an accounting element in accordance with at least some embodiments.

FIG. 2 depicts an illustrative example of a display 200 that may be presented as a result of selecting an accounting element in accordance with at least some embodiments. As depicted, display 200 may be presented in a web browser interface or any other suitable graphic user interface. In display 200, a split view 202 is depicted as being selected (as indicated by the shading). The split view may be selected by a user via a mouse or other user input device. In response, the split view is depicted along with two mapping views 204 and 206 and two deferral views 208 and 210 that each share a relationship with the split view (as indicated by the overlapping borders 205 and 209 respectively). As depicted by display 200, mappings 204 and 206 may each affect a subset of the line items associated with split 202. For example, mapping 204 is depicted as affecting line items 1-6 and mapping 206 is depicted as affecting line items 4-9. It should be noted that multiple mappings may affect the same line items associated with a split. For example, as depicted by display 200, both mapping 204 and mapping 206 affect line items 4-6.

Display 200 may also depict each deferral related to one or more line items associated with the selected accounting element. A deferral 208 or 210 may also affect multiple line items related to a single accounting element or related to multiple accounting elements. In some embodiments, a user may be provided with the ability to "drag and drop" line items into a particular deferral in order to apply the deferral policies to that line item. In some embodiments, a user may be given the ability to select a line item and add a new deferral element to the display. For example, a user may select line item 1 (e.g., by using a mouse to interact with the GUI as describe above) and select an option to add a deferral. In some embodiments, the option to add a deferral may be provided in a drop down menu presented upon the user's selection of the line item 1, the user may also be able to select an icon associated with the functionality of adding a deferral. The type of deferral added may be dependent upon a type associated with the line item. In this example, the user may be asked to provide the value being deferred and what policy is to be applied from a set of policies. In some embodiments, the GUI may be configured to provide a visual indication or a prompt that a value is required for the deferral within the GUI. In some embodiments, the GUI may provide an audio indication or tone that indicates a required field is missing a value.

In some embodiments, upon selecting an accounting element to view in more detail (such as split 202), the display 200 may remove all unrelated line items from presentation. In some embodiments, display 200 may present any line items currently associated with the selected accounting element and any accounting elements that are linked to the selected accounting element via one or more line items. For example, if a user selects split 202, then, in addition to displaying line items 1-9 associated with split 202, the display 202 may also include any line items associated with mappings 204 and 206, as well as any line items associated with deferrals 208 and 210. In some embodiments, a user may set one or more preferences for displaying a level of detail to be displayed via user configuration settings. For example, in addition to setting what line items should be displayed, a user may also select the level of detail displayed in relation to a deferral.

Figure 3:
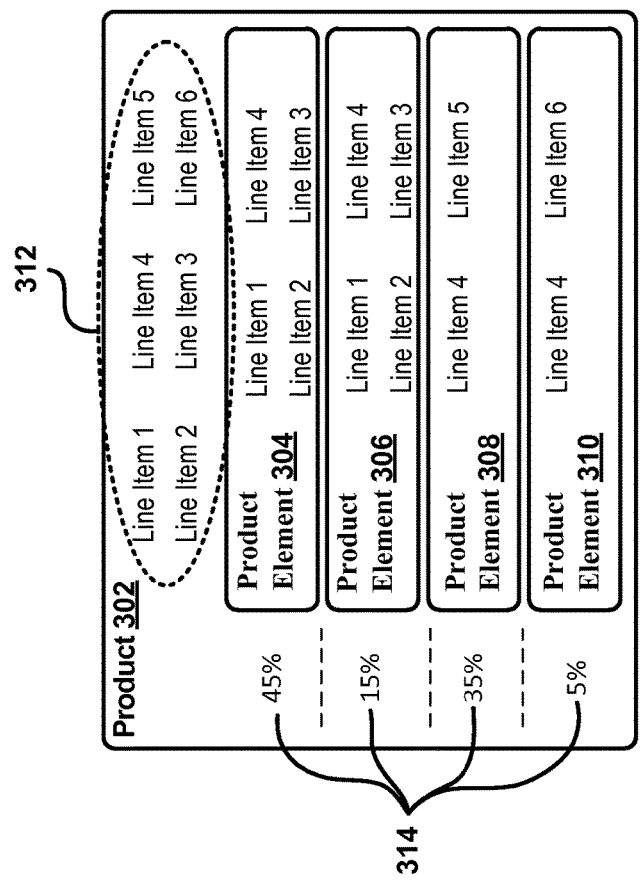
FIG. 3 depicts an illustrative example of a product/split creation panel that may be presented to enable creation of a new product or split in accordance with at least some embodiments.

FIG. 3 depicts an illustrative example of a product/split creation panel 300 that may be presented to enable creation of a new product or split in accordance with at least some embodiments. In panel 300, a split associated with product 302 is depicted as comprising four separate product elements (304, 306, 308, and 310). In panel 300, product 302 may be a multi-element arrangement offering and each product element may represent a separate component of the multi-element arrangement. The product 302 may be associated with a number of line items 312. A line item may be any identifier associated with an accounting object. Line item information may be stored in, and retrieved from, a database table. For example, each line item may be stored as a separate entry in a database table related to accounting entries. In some embodiments, a line item may be stored in several database tables varying by date. By way of illustration, Line item A may have an October entry stored in an October 2015 table and a July entry stored in a July 2015 table. A value stored in association with the line item may vary for each of these entries. In addition, the service provider may maintain a separate relational database table related to storing relationships between a line item and a product. In some embodiments, the line item may be a journal entry that might appear in a ledger or sub-ledger. In another example, the line item may be a "nickname" or reference to an accounting object. A nickname may comprise a unique identifier such as "4R-0000-2350-1500." In some embodiments, the nickname may store an indication as to one or more policies to be applied to the line item. For example, a nickname may contain a 0 or a 1 depending on whether it refers to a revenue or expense.

In accordance with at least some embodiments, each split may be associated with a default policy 314. For example, a product element 306 may have 15% of the revenues and expenses for product 302 associated with it by default. Although the policy in this figure is depicted as a percentage, the policy may be any suitable means of providing a distribution rule. A user may change this policy for the split itself or for any line item within the split. When a new product element is added to product 302, it may inherit one or more line items from the product 302. For example, a new product element may inherit each line item 312 associated with the product. A user may, via the GUI, manually add to or remove line items from the product element. In some embodiments, the user may set a specific policy for each line item associated with a split.

Figure 4:
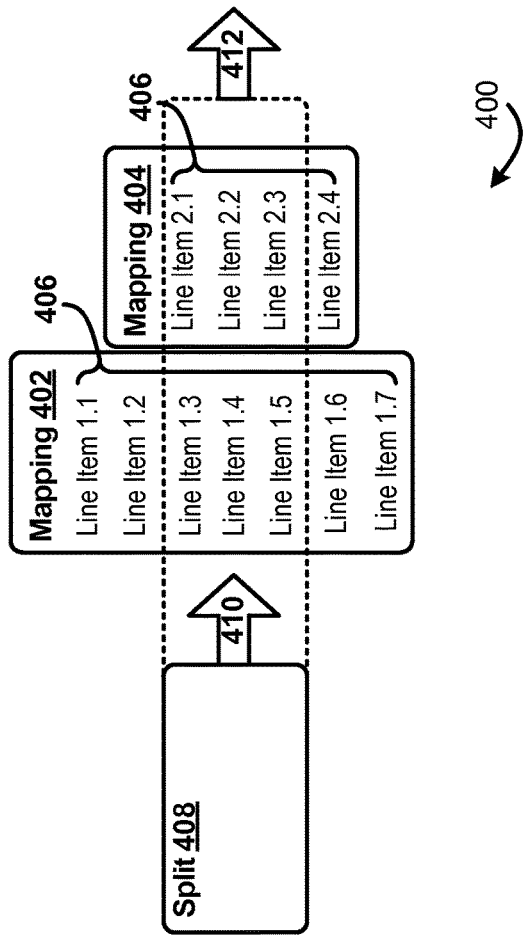
FIG. 4 depicts an illustrative example of a split and mapping assignment panel that may be presented to enable assignment of one or more line items to an accounting object in accordance with at least some embodiments.

FIG. 4 depicts an illustrative example of a split and mapping assignment panel 400 that may be presented to enable assignment of one or more line items to an accounting object in accordance with at least some embodiments. In some embodiments, the split and mapping assignment panel is presented by being rendered by the GUI 100 (depicted in FIG. 1) executed on a display device associated with a user device. In panel 400, mapping 402 and mapping 404 are depicted as having several line items 406 representing accounting entries associated with it. In panel 400, a user may be given the ability to select a split 408 (e.g., by interacting with the GUI using a mouse or other input device) to associate with one or more of the line items 406 of mapping 402 and mapping 404.

In some embodiments of the disclosure, a user is able to move the mappings and/or the split 408 vertically and/or horizontally in order to align particular line items 406. The line items may also be rearranged and/or re-ordered. For example, in some embodiments line items 406 may be dragged and dropped into an appropriate spot using a mouse or other user input device. After aligning/ordering the line items 406, a user may associate one or more line items with the split 408. For example, a user may drag one or more borders of split 408 across mapping 402, mapping 404, or both mappings from a first position 410 to a second position 412 in order to encapsulate a number of line items. In the depicted FIG. 4, line items 1.3, 1.4, and 1.5 from mapping 402 and line items 2.1, 2.2, and 2.3 from mapping 404 may each be associated with the split 408 upon performing this action. Additionally, a user may be given the ability to drag and drop line items from one or more of the mappings onto the split 408 in order to associate that line item with the split 408.

Figure 5:
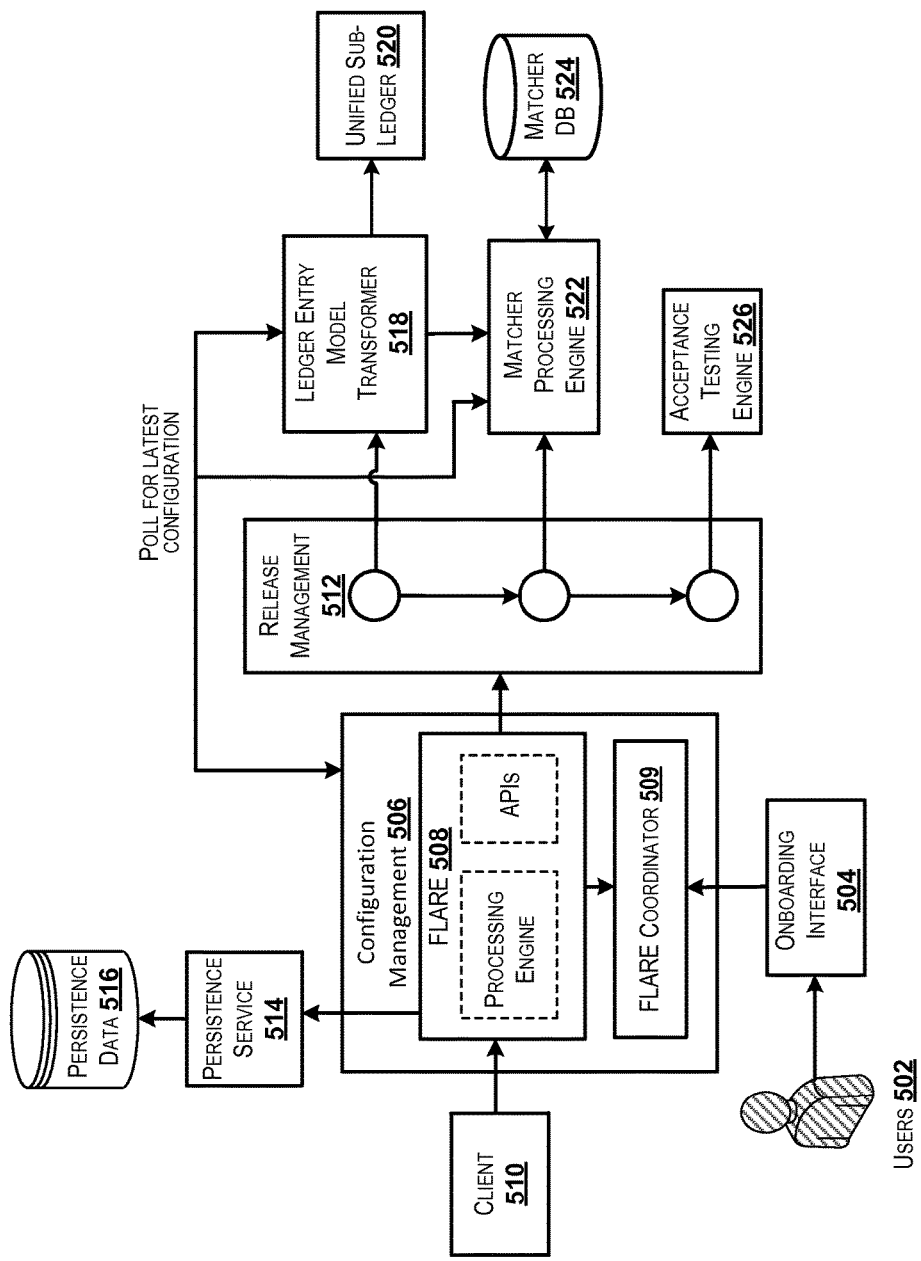
FIG. 5 depicts an illustrative example of a transaction event processing platform that may be implemented to process transaction events and update ledger entries in accordance with at least some embodiments.

FIG. 5 depicts an illustrative example of a transaction event processing platform that may be implemented to process transaction events and update ledger entries in accordance with at least some embodiments. In FIG. 5, one or more users 502 may utilize an onboarding interface 504 to configure rules for processing one or more transaction events. In FIG. 5, onboarding interface 504 may be an example GUI 100 configured to depict and enable manipulation of object relationships, as depicted in FIG. 1. As such, the onboarding interface 504 may be configured to execute any of the functionality described in relation to FIGS. 1-4. A user 502 may be a member of a business team, an administrator, an accountant, or any other suitable business coordinator. The onboarding interface 504 may be any web portal or user interface that provides access to a configuration management service 506 for configuring the behavior of a financial ledgering and reporting engine (FLARE) 508 and may present accounting object data as depicted in FIG. 1. For example, a user 502 may add, remove, or alter rules for handling particular transaction event types to a data store. In some embodiments, mappings or use cases may be provided by a user to provide a translation between a transaction event and an accounting event. The onboarding interface 504 may interact with FLARE via a FLARE coordinator 509. FLARE coordinator 109 may be any application or interface configured to create, set, and maintain one or more policies in configuration management 506.

FLARE 508 may comprise a processing engine and one or more application programming interfaces (APIs). FLARE may be configured to receive an indication of a transaction event from one or more client devices 510 and update accounting ledger entries accordingly. For example, a transaction event may indicate that revenue has been received in relation to a particular product. FLARE 508 would need to identify each line item entry associated with the product and determine (according to the configuration management service 506) how that revenue should be recognized. In this example, FLARE may retrieve one or more mappings from the configuration management service 506 that dictate how the revenue is to be treated. FLARE may then translate the transaction event into an accounting event using the one or more mappings. After an accounting event has been processed by FLARE 508, it may be subjected to one or more workflows by a release management tool 512. A workflow may be any series of directives for processing an accounting event. Additionally, a data persistence service 514 may collect and store data (either raw or processed) in a persistence data store 516. In some embodiments, persistence data 516 may be used for backup and/or reporting purposes.

In some embodiments, a workflow may provide an accounting event to a ledger entry model transformer 518 may be configured to format information from an accounting event into a data model format utilized by a unified sub-ledger 520. The ledger entry model transformer 518 may poll the configuration management 506 to retrieve the most recent policy set related to the current accounting event. This policy set may be used to translate the accounting event into an appropriate format and check that all necessary information has been provided. Once the accounting transaction has been checked against the policy set, it may be written to a unified sub-ledger 520.

In some embodiments, FLARE 508 may be configured to match different accounting records together to produce a point in time balance for a balance sheet account. For example, a balance sheet must always reflect that assets=liabilities+equity. If an accounting event has an overall impact on assets (other than a transition from one asset class to another), then there must be an equivalent accounting event that affects liabilities and/or equity. Accordingly, in order to create a balance sheet for any given point in time, related accounting events may be matched by the FLARE 508 and their relationships stored in a database. To do this, the FLARE 508 may determine that two or more accounting events are related based on a timestamp, an amount, a description, or any combination of factors related to the accounting event.

In some embodiments, a matcher processing engine 522 may be configured to substantiate the value of a balance sheet account with business transaction values that have not yet reached an end state in relation to workflow processes. For example, customer orders may be substantiated against cash receipts and vendor liabilities may be substantiated against cash payments. The matcher processing engine may be configured to use match set definitions stored in a matcher database 524. One or more users may configure match set definitions to match transaction events by event type. For example, a user may configure a match set definition for "sale" transaction events (that debits accounts receivable and credits revenue) to be substantiated against "cash receipt" transaction events (that debits cash and credits accounts receivable). In this example, when a business sends a sale event with a value of $100 to FLARE 508, the transaction may be posted but remain open until it is validated by the matcher processing engine 522. In this example, a second transaction event may be received by FLARE 508 related to a cash receipt of $100. The matcher processing engine 522 reports on any open transactions according to the match set definitions. In this example, the matcher processing engine 522 would report on the open business sale transaction and both would be closed out according to the example match set definition. The matcher processing engine 522 may also be configured to age the match sets to enable aging reports. This also allows users to set configurable rules to create different status dimensions so that operational teams can act upon transactions that have not reached an end state (e.g., take action to collect money from a customer or write off bad debt).

In some embodiments, an acceptance testing engine 526 may be configured to validate each accounting transaction prior to committing it to a production domain. For example, a transaction involving one or more accounting events may be performed in a separate transaction processing domain, where it may be verified by one or more users before the transaction is posted to a general ledger. Additionally, each policy set or mapping may be tested in an acceptance testing domain prior to being implemented in a production environment. In some embodiments, the validation may be performed automatically, or by an automated system. For example, acceptance testing engine 526 may utilize one or more script execution applications to test the transaction.

Figure 6:
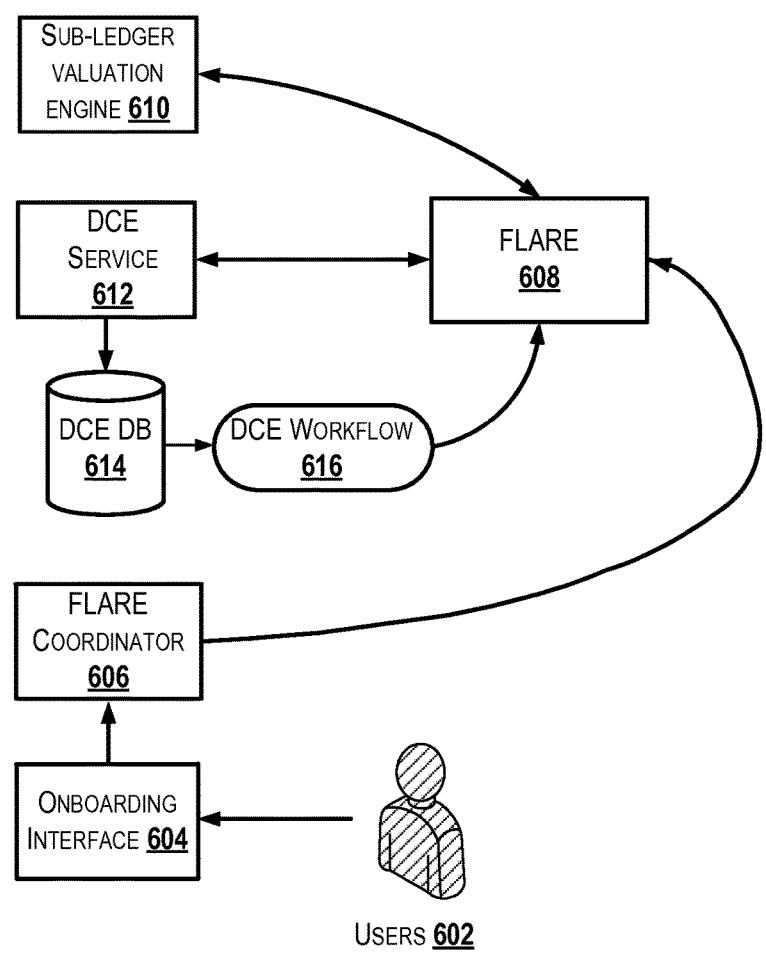
FIG. 6 depicts an illustrative example of a line item update platform in accordance with at least some embodiments.

FIG. 6 depicts an illustrative example of a line item update platform in accordance with at least some embodiments. In FIG. 6, one or more users 602 may utilize an onboarding interface 604 to interact with a FLARE coordinator 606. In FIG. 6, onboarding interface 604 may be an example GUI 100 depicting object relationships, as depicted in FIG. 1. As such, the onboarding interface 604 may be configured to execute any of the functionality described in relation to FIGS. 1-4. A user 602 may be a member of a business team, an administrator, an accountant, or any other suitable business coordinator. FLARE coordinator 606 may be any module or application configured to provide and maintain policy sets for FLARE 608. For example, FLARE coordinator 606 may be configured to present, receive, and/or allow alteration of policy sets stored in relation to various accounting transactions. In this example, the FLARE 608 may, in response to receiving a transaction event, retrieve a policy set related to that transaction event.

Some embodiments of the disclosure may include an sub-ledger valuation engine 610. A sub-ledger valuation engine 610 may be any module or application configured to split single business objects into several objects with specific accounting values assigned to each object. In some embodiments, the sub-ledger valuation engine 610 may create one or more splits for a multi-element arrangement. For example, a multi-element arrangement may comprise a number of separate product elements that are each assigned a category. In this example, one or more splits may be created for each separate category present in the multi-element arrangement. In another example, a first split may be created to attribute revenue to each product elements, and a second split may be created to attribute expenses to each product element.

Some embodiments of the disclosure may include a deferral calculation engine 612 (DCE). A deferral calculation engine 612 may be any module or application configured to accept transaction events that with revenue or expenses that need to be amortized over an extended period of time. For example, some subscriptions may have revenue that should be recognized over a 12, 15, or 24 month duration. In some embodiments, the deferral calculation engine 612 may track the undistributed portion of a deferred accounting value in a deferral calculation engine database 614. For example, the deferral calculation engine 612 may track the balance of unamortized revenue until the entirety of the revenue is allocated or it is cancelled by a customer refund or bad debt. For example, information on revenue that has not yet been recognized may be stored in a deferral calculation engine database 614. This information may be processed on a periodic basis according to a deferral calculation engine workflow 616. A deferral calculation workflow 616 may be any series of directives configured to result in a distribution of an undistributed portion of a deferred accounting object in accordance with the deferral policies for that accounting object.

Figure 7:
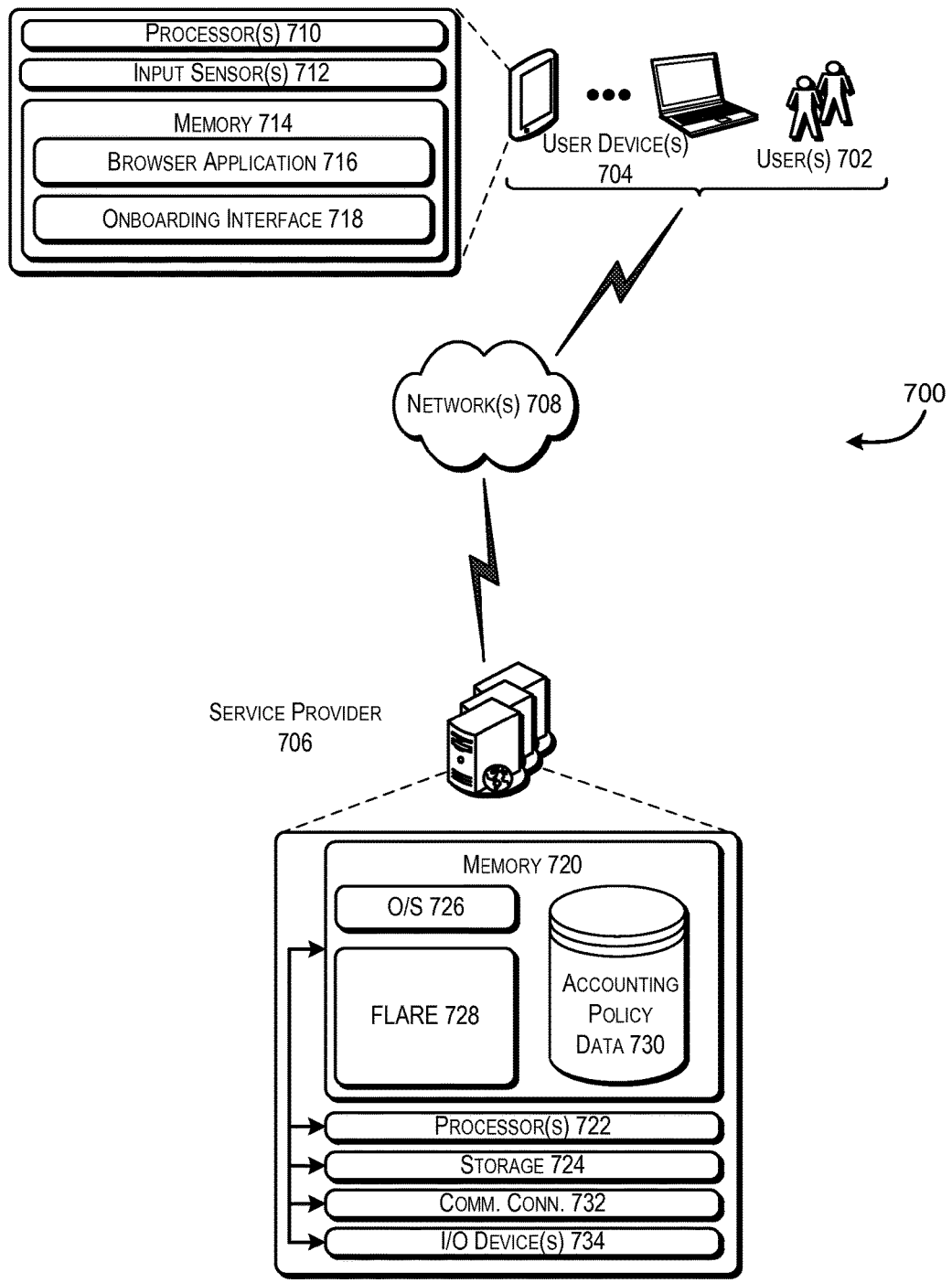
FIG. 7 depicts an illustrative example of a system or architecture in which techniques for configuring and processing business transactions into accounting sub-ledgers may be implemented.

FIG. 7 depicts an illustrative example of a system or architecture 700 in which techniques for configuring and processing business transactions into accounting sub-ledgers may be implemented. A business transaction may be any transaction underlying a transaction event associated with at least one of a revenue, an expense, an asset, a liability, or any combination. In architecture 700, one or more consumers and/or users 702 may utilize user devices 704. In some examples, the user devices 704 may be in communication with a service provider 706 via the network(s) 708, or via other network connections.

The user devices 704 may be any type of computing device such as, but not limited to, a mobile phone, a smart phone, a personal digital assistant (PDA), a laptop computer, a desktop computer, a server computer, a thin-client device, a tablet PC, etc. The user device 704 may include one or more processors 710 capable of processing user input. The user device 704 may also include one or more input sensors 712 for receiving user input. As is known in the art, there are a variety of input sensors 712 capable of detecting user input, such as accelerometers, cameras, microphones, etc. The user input obtained by the input sensors may be from a variety of data input types, including, but not limited to, audio data, visual data, or biometric data. Embodiments of the application on the user device 704 may be stored and executed from its memory 714.

Turning to the contents of the memory 714 in more detail, the memory 714 may include a browser application 716. The memory 714 may also include an onboarding interface module 718 configured to provide a user with access to service provider 706 for configuring the behavior of a financial ledgering and reporting engine (FLARE) 508 (FIG. 5). Although sample architecture 700 depicts an onboarding interface module 718 as being included in the contents of the memory 714 of the user device 704, some embodiments may not include an onboarding interface module 718 in memory 714 of the user device 704. In those embodiments in which the onboarding interface module 718 is not included in memory 714, input received by the input sensors 712 may instead be processed by the service provider 706. This will be described in detail below.

In some embodiments, the onboarding interface module 718 may be configured to provide a user with access to service provider 706 for configuring the behavior of a financial ledgering and reporting engine (FLARE) 508. Onboarding interface 718 may be an example GUI 100 depicted in FIG. 1. As such, the onboarding interface 718 may be configured to execute any of the functionality described in relation to FIGS. 1-4. In some embodiments, a user is able to configure accounting policies related to particular accounting line items, splits, mappings, deferrals, or any other suitable accounting object. For example, a user may elect a percentage of revenue associated with a multi-element arrangement that should be applied to a particular split. The percentage may be stored as a policy that affects a line item for that split's revenue. In this example, the policy may be applied to any transaction event in which revenue is generated for the multi-element arrangement, and the specified percentage of revenue may be associated with the split.

In some examples, the network(s) 708 may include any one or a combination of many different types of networks, such as cable networks, the Internet, wireless networks, cellular networks, and other private and/or public networks. While the illustrated example represents the users 702 accessing the service provider 706 via browser application 716 over the network(s) 708, the described techniques may equally apply in instances where the users 702 interact with a service provider 706 via the user device 704 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

As described briefly above, the browser application 716 may allow the users 702 to interact with a service provider 706, such as to store, access, and/or manage data, develop and/or deploy computer applications, and/or interact with web content. The one or more service providers 706, perhaps arranged in a cluster of servers or as a server farm, may be configured to host a website (or combination of websites) viewable via the user device 704 or a web browser accessible by a user device 704 via the browser application 716. Although depicted in memory of the user device 704 in this example, in some embodiments the browser application 716 may be hosted at a server. For example, the user device 704 may be a thin client device capable of accessing a browser application 716 remotely. The browser application 716 may be capable of handling requests from many users 702 and serving, in response, various user interfaces that can be rendered at the user device 704 such as, but not limited to, a web site. The browser application 716 may be any type of application or interface that supports user interaction with a website, including those with user interaction, such as social networking sites, electronic retailers, informational sites, blog sites, search engine sites, news and entertainment sites, and so forth. As discussed above, the described techniques can similarly be implemented outside of the browser application 716, such as with other applications running on the user device 704.

The service provider 706 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider 706 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider 706 may include at least one memory 720 and one or more processing units (or processor(s)) 722. The processor(s) 722 may be implemented as appropriate in hardware, computer-executable instructions, firmware or combinations thereof. Computer-executable instruction or firmware implementations of the processor(s) 722 may include computer-executable or machine executable instructions written in any suitable programming language to perform the various functions described.

The memory 720 may store program instructions that are loadable and executable on the processor(s) 722, as well as data generated during the execution of these programs. Depending on the configuration and type of service provider 706, the memory 720 may be volatile (such as random access memory (RAM)) and/or non-volatile (such as read-only memory (ROM), flash memory, etc.). The service provider 706 may also include additional storage 724, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 720 may include multiple different types of memory, such as static random access memory (SRAM), dynamic random access memory (DRAM) or ROM. Turning to the contents of the memory 720 in more detail, the memory 720 may include an operating system 726 and one or more application programs or services for implementing the features disclosed herein including at least an engine for consuming transaction events from business source teams and converting the transaction events into appropriate accounting journal entries (financial ledgering and reporting engine (FLARE) 728). The memory 720 may also include accounting policy data 730, which provides information associated with accounting policies. In some embodiments, the accounting policy data 730 may be stored in a database.

The memory 720 and the additional storage 724, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 704 or the service provider 706. The service provider 706 may also contain communications connection(s) 732 that allow the service provider 706 to communicate with a stored database, another computing device or server, user terminals, and/or other devices on the network(s) 708. The service provider 706 may also include input/output (I/O) device(s) and/or ports 734, such as for enabling connection with a keyboard, a mouse, a pen, a voice input device, a touch input device, a display, speakers, a printer, etc.

Turning to the contents of the memory 720 in more detail, the memory 720 may include an operating system 726, a database containing accounting policy data 730 and the one or more application programs or services for implementing the features disclosed herein, including a financial ledgering and reporting engine 728.

In some embodiments, the financial ledgering and reporting engine 728 may be configured to receive transaction event data from one or more event sources and convert the transaction events into appropriate accounting journal entries. For example, the financial ledgering and reporting engine 728 may receive an indication that a transaction event has occurred. In this example, the financial ledgering and reporting engine 728 may identify an accounting policy set that is applicable to the transaction event. Once identified, the financial ledgering and reporting engine 728 may apply the accounting policy set to the transaction event in order to convert it into an accounting event. Information related to the accounting event may be formatted according to one or more accounting policies and entered into a ledger as a ledger entry. In some embodiments, the financial ledgering and reporting engine 728 may be configured to identify and apply deferral policies relevant to the transaction event.

By way of illustrative example, consider the following scenario. A user may create a new multi-element arrangement (e.g., a bundled product). For example, the service provider may provide a bundled product including streaming media service, a set top box television configured to play the streaming media, and a digital over-the-air antenna. The user may then create several splits to represent each of the elements in the multi-element arrangement. Once the splits have been created, the user may assign line items to each of the splits. For example, the user may assign a revenue line item and an expense line item to each of the splits. These two line items may correspond to journal entries for revenue and expenses respectively. For example, the user may create a split related to expenses with respect to the previously mentioned bundled product. In this example, the user may create a split that allocates 80% of the expenses to a line item associated with the set top box television, 10% of the expenses to a line item associated with the streaming media, and 10% of the expenses to a line item associated with the digital over-the-air antenna. The user may also create a mapping, or use case, that relates to one or more of the created splits. For example, the user may create several accounting policies for handling transaction events. In the above bundled product example, the user may create a mapping that a "sale" event should be mapped to the previously created split. The mapping may indicate that that any sale of the bundled product will result in an increase to revenue of the amount of the sale and a decrease in inventory of $700 (the cost to produce the bundled product). Additionally, a user may indicate that the expense related to the streaming media component of the bundled product is to be recognized monthly over the course of a year. The user may set up a deferral for the streaming media component with a straight-line amortization schedule according to this requirement. In the provided example, each time that a user purchases the bundled product for the retail value ($1200 for illustration purposes), $960 will be attributed to the line item for box set televisions, $120 will be attributed to the line item for over-the-air antennas, and $700 will be deducted from the inventory line item. Additionally, the line item related to streaming media will be attributed $10 per month for one year.

In another illustrative example, the user may create a deferral associated with an expense line item of Split 2 from the above example. In this example, the user may set a policy that a particular expense should be amortized at a rate of $\frac{1}{12}^{th}$ over a twelve month period. If the service provider then receives a transaction event related to that expense, then each line item associated with the expense will reflect a portion of the $\frac{1}{12}^{th}$ of the total expense indicated by the transaction event. For illustrative purposes, consider the following scenario. In order to provide a multi-element streaming media service, a service provider may rent several servers. The service provider may pay rent for the servers on a yearly basis but may wish to recognize the rental expense on a monthly basis. In this scenario, the service provider may receive an indication that the yearly rental fee has been paid. Upon receiving that indication, the service provider may convert the transaction event into an accounting event by transferring cash assets into a prepaid rent asset and applying a deferral policy for recognizing the expense. Each month, the service provider may decrease the prepaid rent asset by $\frac{1}{12}^{th}$ and attribute a percentage of that monthly rental fee to each element of the multi-element streaming service elements according to set policies. The expense line items, as well as corresponding journal entries, for each element may then reflect a portion of the rental fee each month.

Accounting policy data store 730 may store and maintain data related to one or more policy sets. In some embodiments, a set of accounting policies related to a particular transaction event or type of transaction event may be stored as a mapping. In some embodiments, a mapping may be used to convert the transaction event into an accounting event. In some embodiments, accounting policy data store 730 may include information related to deferral policies and/or accounting recognition policies.

Figure 8:
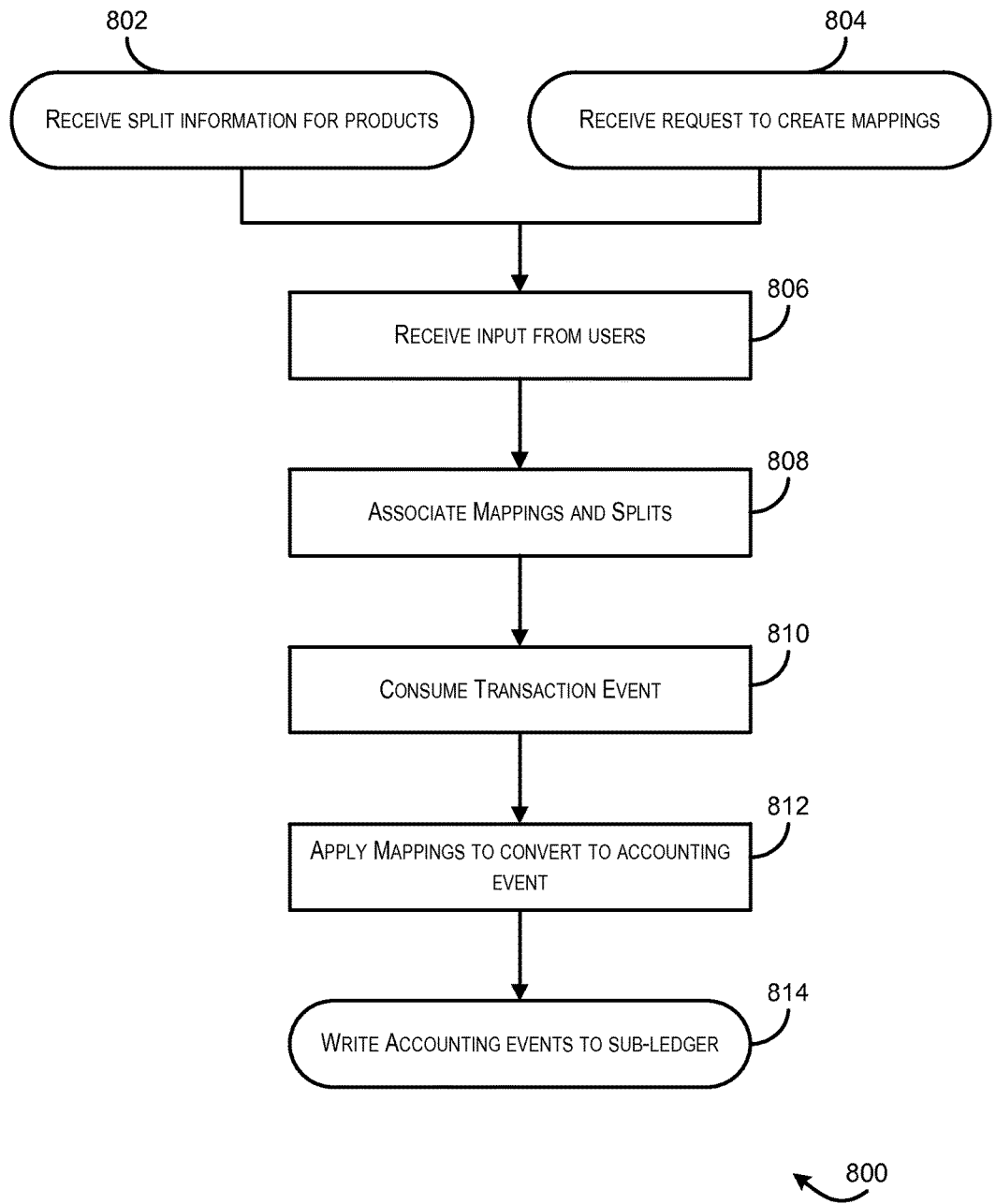
FIG. 8 depicts an illustrative flow chart demonstrating an example platform for processing transaction events into accounting events in accordance with at least some embodiments.

FIG. 8 depicts an illustrative flow chart demonstrating an example platform for processing transaction events into accounting events in accordance with at least some embodiments. The process 800 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 800 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 800 of FIG. 8 may be performed by at least the one or more service providers 706 shown in FIG. 7. The code may be stored on a computer-readable storage medium, for example, in the form of a computer program including a plurality of instructions executable by one or more processors. The computer-readable storage medium may be non-transitory.

Process 800 may begin at 802 when one or more splits are created for a multi-element arrangement product. In some embodiments, a user may manually indicate, in a graphical user interface, each element of the multi-element arrangement that should be separated. The graphical user interface may be an example GUI 100 depicted in FIG. 1. In some embodiments, a split may be created automatically based on a category related to each element. For example, if a multi-element arrangement includes both streaming music and rental of remote server storage space, then the service provider may create separate splits for each of these elements on the basis that streaming music may be categorized as "streaming media" and rental of cloud storage space may be categorized as a "hardware lease." In some embodiments, a split may include multiple product elements of a multi-element arrangement. For example, a split may affect both streaming music and streaming video.

Process 800 may also begin at 804 when one or more mappings are created. In some embodiments, a user may submit a work request to create a mapping element. In some embodiments, the user may construct the mapping element using a graphical user interface. The graphical user interface may be an example GUI 100 depicted in FIG. 1. The mapping may be associated with policies for converting one or more business transactions into an accounting transaction. For example, a mapping may include a policy describing what portion of revenue should be attributed to each split. In this example, if a transaction event is received that is related to the multi-element arrangement that involves a revenue transaction, then the revenue may be attributed to each split according to the mapping.

At 806, a service provider may receive input from one or more users via a graphical user interface. The graphical user interface may be an example GUI 100 depicted in FIG. 1. For example, a user may move the borders of a split view and/or mapping view in order to alter the overlap between the two and subsequently indicate which line items are affected. Additionally, the user may add, remove, or alter a deferral view so that various line items are affected. This allows a user to associate the created mappings and splits at 808 by identifying line items that are associated with both.

Once associations between mappings and splits have been created, one or more transaction events may be consumed by the service provider at 810. Information from the transaction events may be used to create an accounting event by applying one or more mappings to each of the affected line numbers at 812. For example, a transaction event may indicate that a product has generated $1000 in revenue with $500 in expenses (this is a simple illustrative example in which we will only consider these factors). In this example, several accounting events may be created from this transaction event. First, accounting events may be created to reflect revenue generation for each of the line items associated with the transaction event. Second, accounting events may be created to reflect expenses for each of the line items associated with the transaction event. Expenses may be distributed in the same manner/proportion as revenue or in a different manner/proportion. Additionally, accounting events may be created to reflect an increase in cash assets of $500 and a corresponding increase in an equity account of $500. These two transactions may be reconciled against, or used to validate, each other. Each of these accounting events may be subject to deferral policies as well. For example, a deferral policy may dictate that the revenue should be recognized over a 5 month period. In this example, each revenue line item may have 5 accounting events created (one for each month) that reflects a portion of the revenue.

Accounting events may then be written to a ledger or sub-ledger as a journal entry associated with the line item at 814. In some embodiments, accounting events may be validated prior to being written to a ledger. For example, where an accounting event affects a business's balance sheet, the service provider may identify balancing events. In this example, an accounting event that affects the business's assets may need to be offset by an accounting event affecting liabilities, equity, or both that is equal to the accounting event affecting assets.

By way of illustrative example, a user may create several splits from a single multi-element arrangement product. Additionally, the user may create one or more mappings to be associated with the splits. In this example, one of the mappings may provide for revenue distribution amongst the various splits. The graphical user interface, as illustrated in FIG. 1, may depict the mapping having an overlap with each split of the multi-element arrangement that includes one or more revenue lines. If the service provider receives an indication that a transaction event has occurred that involves revenue, the service provider may attribute revenue to each line item according to the policies set forth in the mapping. In some embodiments, mappings may also be specific to transaction event types. For example, consumption of one business even type may trigger a different mapping than consumption of different transaction event type.

Figure 9:
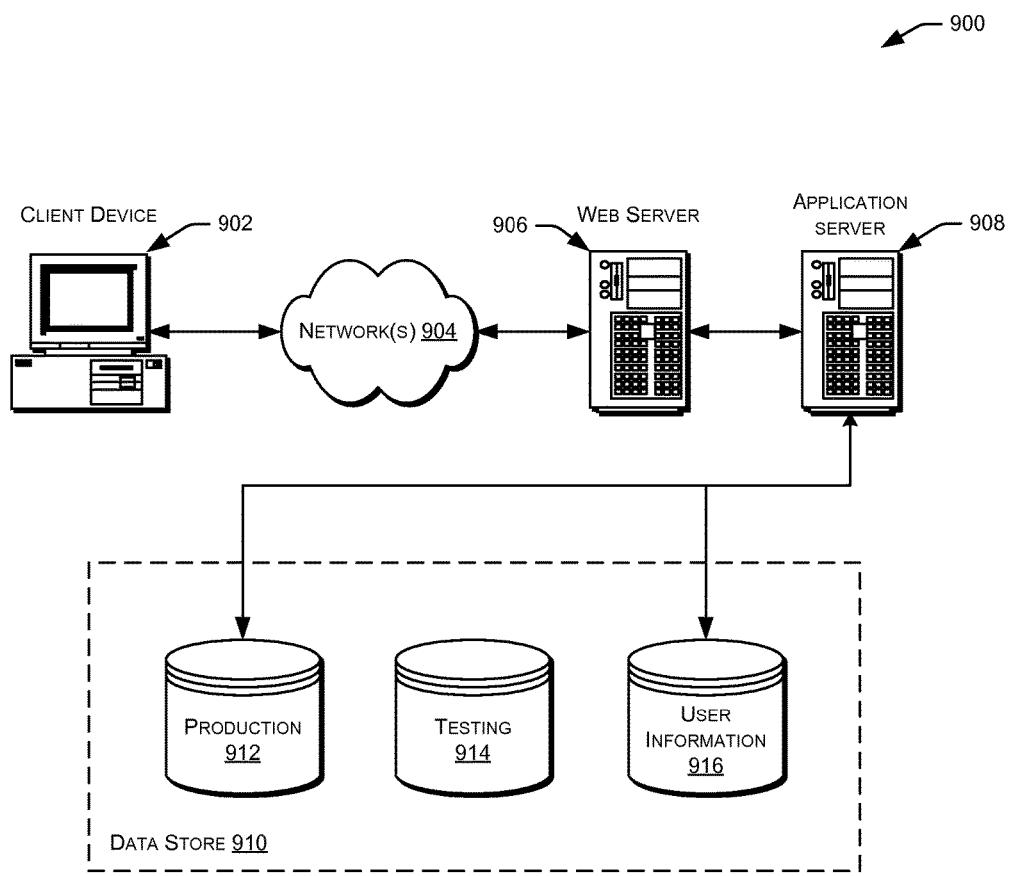
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infra-red network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for presenting a simplified graphical user interface for visualizing and manipulating object relationships, comprising:
   providing, to a graphical user interface of a client device, information associated with a relationship between an accounting element and a mapping, the relationship visualized by a first view related to the accounting element sharing an overlap with a second view related to the mapping, the overlap visualized by a first border associated with the first view and a second border associated with the second view;
   receiving, from the graphical user interface, a modification of the relationship between the accounting element and the mapping, the modification indicated by the first border and the second border updated to enclose at least one accounting line item;

identifying at least one policy set associated with the mapping;

receiving an indication of a transaction event related to the accounting element;

converting the transaction event to an accounting event in accordance with the at least one policy set associated with the mapping;

updating the relationship between the accounting element and the mapping based upon the modification indicated by the first border and the second border; and updating, based at least in part on the accounting event and the updated relationship, a report associated with the accounting element by adjusting an amount associated with the at least one accounting line item.

2. The computer-implemented method of claim 1, wherein the accounting element is a split of a multi-element arrangement offering.

3. The computer-implemented method of claim 1, further comprising receiving, from the graphical user interface, an indication that the at least one accounting line item is associated with a deferral element based at least in part on a third border of a third view associated with the deferral element updated to enclose the at least one accounting line item.

4. The computer-implemented method of claim 3, wherein the at least one accounting line item is updated according to an amortization curve associated with the deferral element.

5. The computer-implemented method of claim 4, wherein a current value with respect to the deferral element is decreased by a deferral period amount and the at least one accounting line item is increased by the deferral period amount.

6. A system comprising:
a processor; and
a memory including instructions that, when executed with the processor, cause the system to, at least:
receive, from a graphical user interface of a client device in response to a user interaction with the graphical user interface, an indication that a line item of a configuration element is associated with a mapping policy, the user interaction resulting in an overlap between a first view associated with the configuration element and a second view associated with the mapping policy that includes the line item, the first view including a first illustrated border, the second view including a second illustrated border, the overlap comprising an enclosed space between the first illustrated border and the second illustrated border that includes the line item;
update a relationship between the line item and the mapping policy based upon the received indication;
receive, from a different computing system, an indication that a transaction event has occurred related to the configuration element; and
process, based on the relationship between the line item and the mapping policy, the transaction event with respect to the line item in accordance with the mapping policy to adjust an amount associated with the line item.

7. The system of claim 6, wherein information from the processed transaction event is written to a journal entry in an accounting ledger.

8. The system of claim 6, wherein the transaction event is associated with a currency value.

9. The system of claim 8, wherein a portion of the currency value is applied to the line item in accordance with the mapping policy.

10. The system of claim 9, wherein the portion of the currency value is applied to the line item according to an amortization schedule.

11. The system of claim 6, wherein the transaction event is associated with at least one of a revenue, an expense, an asset, or a liability.

12. The system of claim 6, wherein the instructions further cause the system to:
validate the processed transaction event according to a reconciliation policy; and
provide information related to the processed transaction event as a ledger entry.

13. The system of claim 12, wherein validating the processed transaction event according to the reconciliation policy comprises matching the transaction event to at least one second transaction event to ensure that the transaction event and the at least one second transaction event are balanced.

14. A non-transitory computer readable medium having program code recorded thereon, for execution on a computer having a graphical user interface, a user input device, and a hardware processor that, upon execution of the program code, causes the computer to:
present, via the display device, a first region associated with a configuration element that includes a first border enclosing the first region and a first set of line items associated with the configuration element depicted within the first border;
present, via the display device, a second region associated with a mapping policy element that includes a second border enclosing the second region and a second set of line items associated with the mapping policy element depicted within the second border;
present, via the display device, a relationship between the configuration element and the mapping policy element by illustrating an overlap between the first border and the second border;
receive via the display device, an indication that at least one of the first border or the second border has been updated such that the overlap includes a third set of line items, the third set of line items including at least one line item included in both the first set of line items and the second set of line items; and
adjust an amount associated with the third set of line items based on the configuration element and the mapping policy element.

15. The non-transitory computer readable medium of claim 14, wherein the user input device is configured to detect a user interaction and the hardware processor further causes the computer to receive a command as a result of the user interaction and to update the relationship between the configuration element and the mapping policy element by altering the displayed third set of line items.

16. The non-transitory computer readable medium of claim 15, wherein the updated relationship between the configuration element and the mapping policy element is provided to a service provider storing the relationship.

17. The non-transitory computer readable medium of claim 15, wherein the user interaction is an update to the overlap between the first border and the second border that comprises an extension or retraction of either the first border or the second border.

18. The non-transitory computer readable medium of claim 14, wherein the hardware processor further causes the computer to present, via the display device, a third region associated with a deferral element that includes a third border enclosing the third region.

19. The non-transitory computer readable medium of claim 18, wherein a second relationship is depicted between the deferral element and at least one of the mapping policy element and the configuration element by a second overlap between the third border and at least one of the first border and the second border, the second overlap including at least one line item included in either the first set of line items or the second set of line items.

20. The non-transitory computer readable medium of claim 14, wherein the configuration element is associated with an indication of how a value is to be distributed amongst the first set of line items.

* * * * *